United States Patent
Eldrid et al.

(12)

(10) Patent No.: US 6,334,295 B1
(45) Date of Patent: Jan. 1, 2002

(54) ROTATING DIFFUSER FOR PRESSURE RECOVERY IN A STEAM COOLING CIRCUIT OF A GAS TURBINE

(75) Inventors: Sacheverel Q. Eldrid, Saratoga Springs; Samir A. Salamah, Niskayuna; Thomas Daniel DeStefano, Ballston Lake, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/726,214

(22) Filed: Nov. 28, 2000

Related U.S. Application Data (63) Continuation of application No. 09/239,276, filed on Jan. 29, 1999, now abandoned.

(51) Int. Cl.[7] .............................. F02C 6/18; F02C 7/16
(52) U.S. Cl. .................... 60/39.02; 60/39.182; 60/39.75
(58) Field of Search ........................... 60/39.02, 39.182, 60/39.75; 415/114

(56) References Cited

U.S. PATENT DOCUMENTS

| 4,424,668 A | 1/1984 | Mukherjee |
| 5,428,950 A | 7/1995 | Tomlinson et al. |
| 5,593,274 A | 1/1997 | Carreno et al. |
| 5,695,319 A | 12/1997 | Matsumoto et al. |
| 6,007,299 A | 12/1999 | Uematsu |
| 6,155,040 A * | 12/2000 | Sasaki ........................ 60/39.75 |
| 6,224,327 B1 * | 5/2001 | Aoki et al. .................. 415/114 |

OTHER PUBLICATIONS

"39th GE Turbine State–of–the–Art Technology Seminar", Tab 1, "F" Technology –the First Half–Million Operating Hours 38 , H.E. Miller.
"39th GE Turbine State–of–the–Art Technology Seminar", Tab 2, "GE Heavy–Duty Gas Turbine Performance Characteristics", F. J. Brooks.
"39th GE Turbine–State–of–the–Art Technology Seminar", Tab 3, "9EC 50 Hz 170–MW Class Gas Turbine", A. S. Arrao.
"39th GE Turbine State–of–the–Art Technology Seminar", Tab 4, "MWS6001FA –An Advanced–Technology 70–MW Class 50/60 Hz Gas Turbine", Ramachandran et al.
"39th GE Turbine State–of–the–Art Technology Seminar", Tab 5, "Turbomachinery Technology Advances at Nuovo Pignone", Benvenuti et al.
"39th GE Turbine State–of–the–Art Technology Seminar", Tab 6, "GE Aeroderivative Gas Turbines –Design and Operating Features", M.W. Horner.
"39th GE Turbine State–of–the–Art Technology Seminar", Tab 7, "Advance Gas Turbine Materials and Coatings", P.W. Schilke.
"39th GE Turbine State–of–the Art Technology Seminar", Tab 8, "Dry Low $NO_x$ Combustion Systems for GE Heavy–Duty Turbines", L. B. Davis.
"39th GE Turbine State–of–the Art Technology Seminar", Tab 9, "GE Gas Turbine Combustion Fleixibility", M. A. Davi.

(List continued on next page.)

Primary Examiner—Louis J. Casaregola
(74) Attorney, Agent, or Firm—Nixon & Vanderhye (57) ABSTRACT

The buckets of a gas turbine are steam-cooled via a bore tube assembly having concentric supply and spent cooling steam return passages rotating with the rotor. A diffuser is provided in the return passage to reduce the pressure drop. In a combined cycle system, the spent return cooling steam with reduced pressure drop is combined with reheat steam from a heat recovery steam generator for flow to the intermediate pressure turbine. The exhaust steam from the high pressure turbine of the combined cycle unit supplies cooling steam to the supply conduit of the gas turbine.

17 Claims, 3 Drawing Sheets

OTHER PUBLICATIONS

"39th GE Turbine State–of–the–Art Technology Seminar", Tab 10, "Gas Fuel Clean–Up System Design Considerations for GE Heavy–Duty Gas Turbines", C. Wilkes.

"39th GE Turbine State–of–the–Art Technology Seminar", Tab 11, "Integrated Control Systems for Advanced Combined Cycles", Chu et al.

"39th GE Turbine State–of–the–Art Technology Seminar", Tab 12, "Power Systems for the 21st Century "H" Gas Turbine Combined Cycles", Paul et al.

"39th GE Turbine State–of–the Art Technology Seminar", Tab 13, "Clean Coal and Heavy Oil Technologies for Gas Turbines", D. M. Todd.

"39th GE Turbine State–of–the–Art Technology Seminar", Tab 14, "Gas Turbine Conversions, Modifications and Uprates Technology", Stuck et al.

"39th GE Turbine State–of–the–Art Technology Seminar", Tab 15, "Performance and Reliability Improvements for Heavy–Duty Gas Turbines, " J. R. Johnston.

"39th GE Turbine State–of–the–Art Technology Seminar", Tab 16, "Gas Turbine Repair Technology", Crimi et al.

"39th GE Turbine State–of–the–Art Technology Seminar", Tab 17, "Heavy Duty Turbine Operating & Maintenance Considerations", R. F. Hoeft.

"39th GE Turbine State–of–the–Art Technology Seminar ", Tab 18, "Gas Turbine Performance Monitoring and Testing", Schmitt et al.

"39th GE Turbine State–of–the–Art Technology Seminar ", Tab 19, "Monitoring Service Delivery System and Diagnostics", Madej et al.

"39th GE Turbine State–of–the–Art Technology Seminar", Tab 20, "Steam Turbines for LargePower Applications", Reinker et al.

"39th GE Turbine State–of–the–Art Technology Seminar", Tab 21, "Steam Turbines for Ultrasupercritical Power Plants", Retzlaff et al.

"39th GE Turbine State–of–the–Art Technology Seminar", Tab 22, "Steam Turbine Sustained Efficiency", P. Schofield.

"39th GE Turbine State–of–the–Art Technology Seminar", Tab 23, "Recent Advances in Steam Turbines for Industrial and Cogeneration Applications", Leger et al.

"39th GE Turbine State–of–the–Art Technology Seminar", Tab 24, "Mechanical Drive Steam Turbines", D. R. Leger.

"39th GE Turbine State–of–the–Art Technolgy Seminar", Tab 25, "Steam Turbines for STAG ™Combined–Cycle Power System", M. Boss.

"39th GE Turbine State–of–the–Art Technology Seminar", Tab 26, "Cogeneration Application Considerations", Fisk et al.

"39th GE Turbine State–of–the–Art Technology Seminar", Tab 27, "Performance and Economic Considerations of Repowering Steam Power Plants", Stoll et al.

"39th GE Turbine State–of–the–Art Technology Seminar", Tab 28, "High–Power–Density ™ Steam Turbine Design Evolution", J. H. Moore.

"39th Ge Turbine State–of–the–Art Technology Seminar", Tab 29, "Advances in Steam Path Technologies", Cofer, IV, et al.

"39th GE Turbine State–of–the–Art Technology Seminar", Tab 30, "Upgradable Opportunities for Steam Turbines", D. R. Dreier, Jr.

"39th GE Turbine State–of–the–Art Technology Seminar", Tab 31, "Uprate Options for Industrial Turbines", R. C. Beck.

"39th GE Turbine State–of–the–Art Technology Seminar", Tab 32, "Thermal Performance Evaluation and Assessment of Steam Turbine Units", P. Albert.

"39th GE Turbine State–of–the–Art Technology Seminar", Tab 33, "Advances in Welding Repair Technology "J. F. Nolan.

"39th GE Turbine State–of–the–Art Technology Seminar", Tab 34, "Operation and Maintenance Strategies to Enhance Plant Profitability", MacGillivray et al.

"39th GE Turbine State–of–the Art Technology Seminar", Tab 35, "Generator Insitu Inspections", D. Stanton.

"39th GE Turbine State–of–the Art Technology Seminar", Tab 36, "Generator Upgrade and Rewind", Halpern et al.

"39th GE Turbine State–of–the–Art Technology Seminar", Tab 37, "GE Combined Cycle Product Line and Performance", Chase, et al.

"39th GE Turbine State–of–the–Art Technology Seminar", Tab 38, "GE Combined Cycle Experience", Maslak et al.

"39th GE Turbine State–of–the–Art Technology Seminar", Tab 39, "Single–Shaft Combine Cycle Power Generation Systems", Tomlinson et al.

"Advanced Turbine System Program –Conceptual Design and Product Development", Annual Report, Sep. 1, 1994 – Aug. 31, 1995.

"Advanced Turbine Systems (ATS Program) Conceptual Design and Product Development", Final Technical Progress Report, vol. 2–Industrial Machine, Mar. 31, 1997, Morgantown, WV.

"Advanced Turbine Systems (ATS Program), Conceptual Design and Product Development", Final Technical Progress Report, Aug. 31, 1996, Morgantown, WV.

"Advanced Turbine Systems (ATS) Program, Phase 2, Conceptual Design and Product Development", Yearly Technical Progress Report, Reporting Period: Aug. 25, 1993 –Aug. 31, 1994.

"Advanced Turbine Systems"Annual Program Review, Preprints, Nov. 2–4, 1998, Washington, D.C. U.S. Department of Energy, Office of Industrial Technologies Federal Energy Technology Center.

"ATS Conference"Oct. 28, 1999, Slide Presentation.

"Baglan Bay Launch Site", various articles relating to Baglan Energy Park.

"Baglan Energy Park", Brochure.

"Commercialization", Del Williamson, Present, Global Sales, May 8, 1998.

"Environmental, Health and Safety Assessment: ATS 7H Program (Phase 3R) Test Activities at the GE Power Systems Gas Turbine Manufacturing Facility, Greenville, SC", Document #1753, Feb. 1998, Publication Date: Nov. 17, 1998, Report Numbers DE–FC21–95M31176—11.

"Exhibit panels used at 1995 product introduction at PowerGen Europe".

"Extensive Testing Program Validates High Efficiency, reliability of GE's Advanced "H"Gas Turbine Technology", Press Information, Press Release, 96–NR14, Jun. 26, 1996, H Technology Tests/pp. 1–4.

"Extensive Testing Program Validates High Efficiency, Reliability of GE's Advanced "H"Gas Turbine Technology", GE Introduces Advanced Gas Turbine Technology Platform: First to Reach 60% Combined–Cycle Power Plant Efficiency, Press Information, Press Release, Power–Gen Europe '95, 95–NRR15, Advanced Technology Introduction/pp. 1–6.

"Gas Steam Turbine Work as Single Unit in Ge's Advanced H Technology Combined–Cycle System", Press Information, Press Release, 95–NR18, May 16, 1995, Advanced Technology Introduction/pp. 1–3.
"GE Breaks 60% Net Efficiency Barrier"paper 4 pages.
"GE Business Share Technologies and Experts to Develop State–of–the Art Products", Press Information, Press Release 95–NR10, May 16, 1995, GE Technology Transfer/pp. 1–3.
"General Electric ATS Program, Technical Review, Phase 2 Activities", T. Chance et al., pp. 1–4.
"General Electric DOE/ATS H Gas Turbine Development" Advanced Turbine Systems Annual Review Meeting, Nov. 7–8, 1996, Washington, D.C., Publication Release.
"H Technology Commercialization", 1998 MarComm Activity Recommendation, March, 1998.
"H Technology", Jon Ebacher, VP, Power Gen Technolgy, May 8, 1998.
"H Testing Process", John Ebacher, VP, Power Gen Technology, May 8, 1998.
"Heavy–Duty & Aeroderivative Products"Gas Turbines, Brochure, 1998.
"MS7001H/MS9001H Gas Turbine, gepower.com website for PowerGen Europe"Jun. 1–3 going public, Jun. 15, (1995).
"New Steam Cooling System is a Key to 60% Efficiency For GE "H"Technology Combined–Cycle Systems", Press Information, Press Release, 95–NRR16, May 16, 1995, H Technology/pp. 1–3.
"Overview of GE's H Gas Turbine Combined Cycle", Jul. 1, 1995 to Dec. 31, 1997.
"Power System for the $21^{st}$ Century –"H"Gas Turbine Combined Cycles", Thomas C. Paul et al., Report,.
"Power–Gen '96 Europe ", Conference Programme, Budapest, Hungary, Jun. 26–28, 1996.
"Power–Gen International", 1998 Show Guide, Dec. 9–11, 1998, Orange County Convention Center, Orlando, Florida.
"Press Coverage following 1995 product announcement"; various newspaper clippings relating to improved generator.
"Proceedings of the Advanced Turbine Systems Annual Program Review Meeting", vol. I, "Industrial Advanced Turbine Systems Program Overview", D.W. Esbeck, p. 3.
"Proceedings of the Advanced Turbine Systems Annual Program Review Meeting", vol. I, "Overview of Westinghouse's Advanced Turbine System Program", Bannister et al. p. 22.
"Proceedings of the Advanced Turbine Systems Annual Program Review Meeting", vol. I, "Allison Engine ATS Program Technical Review", D. Mukavetz, p. 31.
"Proceedings of the Advanced Turbine Systems Annual Program Review Meeting", vol. I, "Advanced Turbine Systems Program Industrial System Concept Development", S. Gates, p. 43.
"Proceedings of the Advanced Turbine Systems Annual Program Review Meeting", vol. I, "Advanced Turbine System Program Phase 2 Cycle Selection", Latcovich, Jr., p. 64.
"Proceedings of the Advanced Turbine Systems Annual Program Review Meeting", vol. I, "General Electric ATS Program Technical Review Phase 2 Activities", Chance et al. p. 70.
"Proceedings of the Advanced Turbine Systems Annual Program Review Meeting", vol. I, "Technical Review of Westinghouse's Advanced Turbine Systems Program", Diakunchak et al., p. 75.

"Proceedings of the Advanced Turbine Systems Annual Program Review Meeting", vol. I, "Advanced Combustion Turbines and Cycles: An EPRI Perspective", Touchton et al., p. 87.
"Proceedings of the Advanced Turbine Systems Annual Program Review Meeting", vol. I, "Advanced Turbine Systems Annual Program Review", William E. Koop, p. 89.
"Proceedings of the Advanced Turbine Systems Annual Program Review Meeting", vol. I, "The AGTSR Consortium: An Update", Fant et al., p. 93.
"Proceedings of the Advanced Turbine Systems Annual Program Review Meeting", vol. I, "Overview of Allison/AGTSR Interactions", Sy A. Ali, p. 103.
"Proceedings of the Advanced Turbine Systems Annual Program Review Meeting", vol. I, "Design Factors for Stable Lean Premix Combustion", Richards et al., p. 107.
"Proceedings of the Advanced Turbine Systems Annual Program Review Meeting", vol. I, "Ceramic Stationary as Turbine", M. van Roode, p. 114.
"Proceedings of the Advanced Turbine Systems Annual Program Review Meeting", vol. I, "DOE/Allison Ceramic Vane Effort", Wenglarz et al., p. 148.
"Proceedings of the Advanced Turbine Systems Annual Program Review Meeting", vol. I, "Materials/Manufacturing Element of the Advanced Turbine Systems Program", Karnitz et al., p. 152.
"Proceedings of the Advanced Turbine Systems Annual Program Review Meeting", vol. I, "Land–Based Turbine Casting Initiative", Mueller et al., p. 161.
"Proceedings of the Advanced Turbine Systems Annual Program Review Meeting", vol. I, "Pratt & Whitney Thermal Barrier Coatings", Bornstein et al., p. 182.
"Proceedings of the Advanced Turbine Systems Annual Program Review Meeting", vol. I, "Westinhouse Thermal Barrier Coatings", Goedjen et al., p. 194.
"Proceedings of the Advanced Turbine Systems Annual Program Review Meeting", vol. I, "High Performance Steam Development", Duffy et al., p. 200.
"Proceedings of the Advanced Turbine Systems Annual Program Review Meeting", vol. II, "Lean Premixed Combustion Stabilized by Radiation Feedback and heterogeneous Catalysis", Dibble et al., p. 221.
"Proceedings of the Advanced Turbine Systems Annual Program Review Meeting", vol. II, Rayleigh/Raman/LIF Measurements in a Turbulent Lean Premixed Combustor, Nandula et al. p. 233.
"Proceedings of the Advanced Turbine Systems Annual Program Review Meeting", vol. II, "Lean Premixed Flames for Low $No_x$Combustors", Sojka, et al., p. 249.
"Proceedings of the Advanced Turbine Systems Annual Program Review Meeting", vol. II, "Functionally Gradient Materials for Thermal Barrier Coatings in Advanced Gas Turbine Systems", Banovic et al., p. 276.
"Proceedings of the Advanced Turbine Systems Annual Program Review Meeting", vol. II, "Advanced Turbine Cooling, Heat Transfer, and Aerodynamic Studies", Han et al., p. 281.
"Proceedings of the Advanced Turbine Systems Annual Program Review Meeting", vol. II, "Life Prediction of Advanced Materials for Gas Turbine Application", Zamrik et al., p. 310.

"Proceedings of the Advanced Turbine Systems Annual Program Review Meeting", vol. II, "Advanced Combustion Technologies for Gas Turbine Power Plants", Vandsburger et al., p. 328.

"Proceedigns of the Advanced Turbine Systems Annual Program Review Meeting", vol. II, "Combustion Modeling in Advanced Gas Turbine Systems", Smoot et al., p. 353.

"Proceedings of the Advanced Turbine Systems Annual Program Review Meeting", vol. II, "Heat Transfer in a Two–Pass Internally Ribbed Turbibne Blade Coolant Channel with Cylindrical Vortex Generators", Hibbs et al. p. 371.

"Proceedings of the Advanced Turbine Systems Annual Program Review Meeting", vol. II, "Rotational Effects on Turbine Blade Cooling", Govatzidakia et al., p. 391.

"Proceedigns of the Advanced Turbine Systems Annual Program Review Meeting", vol. II, "Manifold Methods for Methane Combustion", Yang et al., p. 393.

"Proceedings of the Advanced Turbine Systems Annual Program Review Meeting", vol. II, "Manifold Methods for Methane Combustion", Yang et al., p. 393.

"Proceedings of the Advanced Turbine Systems Annual Program Review Meeting", vol. II, "Advanced Multistage Turbine Blade Aerodynamics, Performance, Cooling, and Heat Transfer", Fleeter et al., p. 410.

"Proceedings of the Advanced Turbine Systems Annual Program Review Meeting", vol. II, The Role of Reactant Unmixedness, Strain Rate, and Length Scale on Premixed Combustor Performance, Samuelsen et al., p. 415.

"Proceedings of the Advanced Turbine Systems Annual Program Review Meeting", vol. II, "Experimental and Computational Studies of Film Cooling with Compound Angle Injection", Goldstein et al., p. 423.

"Proceedings of the Advanced Turbine Systems Annual Program Review Meeting", vol. II, "Compatibility of Gas Turbine Materials with Steam Cooling", Desai et al., p. 452.

"Proceedings of the Advanced Turbine Systems Annual Program Review Meeting", vol. II, "Use of a Laser–Induced Fluorescence Thermal Imaging System for Film Cooling Heat Transfer Measurement", M. K. Chyu, p 465.

"Proceedings of the Advanced Turbine Systems Annual Program Review Meeting", vol. II, Effects of Geometry on Slot–Jet Film Cooling Performance, Hyams et al., p. 474.

"Proceedings of the Advanced Turbine Systems Annual Program Review Meeting", vol. II, "Steam as Turbine Blade Coolant: Experimental Data Generation", Wilmsen et al., p. 497.

"Proceedings of the Advanced Turbine Systems Annual Program Review Meeting", vol. II, "Combustion Chemical Vapor Deposited Coatings for Thermal Barrier Coating Systems", Hampikian et al., p. 506.

"Proceedings of the Advanced Turbine Systems Annual Program Review Meeting", vol. II, "Premixed Burner Experiments: Geometry, Mixing and Flame Structure Issues", Gupta et al., p. 516.

"Proceedings of the Advanced Turbine Systems annual Program Review Meeting", vol. II, "Intercooler Flow Path for Gas Turbines: CFD Design and Experiments", Agrawal et al., p. 529.

"Proceedings of the Advanced Turbine Systems Annual Program Review Meeting", vol. II, "Bond Strength and Stress Measurements in Thermal Barrier Coatings", Gell et al., p. 539.

"Proceedings of the Advanced Turbine Systems Annual Program Review Meeting", vol. II, "Active Control of Combustion Instabilities in Low $NO_x$ Gas Turbines", Zinn et al., p. 550.

"Proceedings of the Advanced Turbine Systems Annual Program Review Meeting", vol. II, "Combustion Instability Modeling and Analysis", Santoro et al., p. 552.

"Proceedings of the Advanced Turbine Systems Annual Program Review Meeting", vol. II, "Flow and Heat Transfer in Gas Turbie Disk Cavities Subject ot Nonuniform External Pressure Field", Roy et al., p. 560.

"Proceedings of the Advanced Turbine Systems Annual Program Review Meeting", vol. II, "Heat Pipe Turbine Vane Cooling", Langston et al., p. 566.

"Proceedings of the Advanced Turbine Systems Annual Program Review Meeting", vol. II, "Improved Modeling Techniques for Turbomachinery Flow Fields", Lakshminarayana et al., p. 573.

"Proceedings of the Advanced Turbine Systems Annual Program Review Meeting", vol. II, "Advanced 3D Inverse Method for Designing Turbomachine Blades", T. Dang, p. 582.

"Proceedings of the Advanced Turbine Systems Annual Program Review Meeting", vol. II, "ATS and the Industries of the Future", Denise Swink, p. 1.

"Proceedings of the Advanced Turbine Systems Annual Program Review Meeting", vol. II, "Gas Turbine Association Agenda", William H. Day, p. 3.

"Proceedings of the Advanced Turbine Systems Annual Program Review Meeting", vol. II, "Power Needs in the Chemical Industry", Keith Davidson p. 17.

"Proceedings of the Advanced Turbine Systems Annual Program Review Meeting", "Advanced Turbine Systems Program Overview", David Esbeck, p. 27.

"Proceedings of the Advanced Turbine Systems Annual Program Review Meeting", vol. II, "Westinghouse's Advanced Turbine Systems Program", Gerard McQuiggan, p. 35.

"Proceedings of the Advanced Turbine Systems Annual Program Review Meeting", "Overview of GE's H Gas Turbine Combined Cycle", Cook et al., p. 49.

"Proceedings of the Advanced Turbine Systems Annual Program Review Meeting", "Allison Advanced Simple Cycle Gas Turbine System", William D. Weisbrod, p. 73.

"Proceedings of the Advanced Turbine Systems Annual Program Review Meeting", "The AGTSR Industry–University Consortium", Lawrence P. Golan, p. 95.

"Proceedings of the Advanced Turbine Systems Annual Program Review Meeting", "$NO_x$ and CO Emissions Models for Gas–Fired Lean–Premixed Combustion Turbines", A. Mellor, p. 111.

"Proceedings of the Advanced Turbine Systems Annual Program Review Meeting", "Methodologies for Active Mixing and Combustion Control", Uri Vandsburger, p. 123.

"Proceedings of the Advanced Turbine Systems Annual Program Review Meeting", "Combustion Modeling in Advanced Gas Turbine Systems", Paul O. Hedman, p. 157.

"Proceedings of the Advanced Turbine Systems Annual Program Review Meeting", "Manifold Methods for Methane Combustion", Stephen B. Pope, p. 181.

"Proceedings of the Advanced Turbine Systems Annual Program Review Meeting", "The Role of Reactant Unmixedness, Strain Rate, and Length Scale on Premixed Combustor Performance", Scott Samuelsen, p. 189.

"Proceedings of the Advanced Turbine Systems Annual Program Review Meeting", "Effect of Swirl and Momentum Distribution on Temperature Distribution Premixed Flames", Ashwani K. Gupta, p. 211.

"Proceedings of the Advanced Turbine Systems Annual Program Review Meeting", "Combustion Instability Studies Application to Land–Based Gas Turbine Combustors", Robert J. Santoro, p. 233.

"Proceedings of the Advanced Turbine Systems Annual Program Review Meeting", Active Control of Combustion Instabilities in Low $NO_x$ Turbines, Ben T. Zinn, p. 253.

"Proceedings of the Advanced Turbine Systems Annual Program Review Meeting", "Life Prediction of Advanced Materials for Gas Turbine Application", Sam Y. Zamrik, p. 265.

"Proceedings of the Advanced Turbine Systems Annual Program Review Meeting", "Combustion Chemical Vapor Deposited Coatings for Thermal Barrier Coating Systems", W. Brent Carter, p. 275.

"Proceedings of the Advanced Turbine Systems Annual Program Review Meeting", "Compatibility of Gas Turbine Materials with Steam Cooling", Vimal Desai, p. 291.

"Proceedings of the Advanced Turbine Systems Annual Program Review Meeting", "Bond Strength and Stress Measurements in Thermal Barrier Coatings", Maurice Gell, p. 315.

"Proceedings of the Advanced Turbine Systems Annual Program Review Meeting", "Advanced Multistage Turbine Blade Aerodynamics, Performance, Cooling and Heat Transfer", Sanford Fleeter, p. 335.

"Proceedings of the Advanced Turbine Systems Annual Program Review Meeting", "Flow Characteristics of an Intercooler System for Power Generating Gas Turbines", Ajay K. Agrawal, p. 357.

"Proceedings of the Advanced Turbine Systems Annual Program Review Meeting", "Improved Modeling Techniques for Turbomachinery Flow Fields", B. Lakshiminarayana, p. 371.

"Proceedings of the Advanced Turbine Systems Annual Program Review Meeting", "Development of an Advanced 3d & Viscous Aerodynamic Design Method for Turbomachine Components in Utility and Industrial Gas Turbine Applications", Thong Q. Dang, p. 393.

"Proceedings of the Advanced Turbine Systems Annual Program Review Meeting", "Advanced Turbine Cooling, Heat Transfer, and Aerodynamic Studies", Je–Chin Han, p. 407.

"Proceedings of the Advanced Turbine Systems Annual Program Review Meeting", "Heat Transfer in a Two–Pass Internally Ribbed Turbine Blade Coolant Channel with Vortex Generators", S. Acharya, p. 427.

"Proceedings of the Advanced Turbine Systems Annual Program Review Meeting", "Experimental and Computational Studies of Film Cooling with Compound Angle Injection", R. Goldstein, p. 447.

"Proceedings of the Advanced Turbine Systems Annual Program Review Meeting", "Study of Endwall Film Cooling with a Gap Leakage Using a Thermographic Phosphor Fluorescence Imaging System", Mingking K. Chyu, p. 461.

"Proceedings of the Advanced Turbine Systems Annual Program Review Meeting", "Steam as a Turbine Blade Coolant: External Side Heat Transfer", Abraham Engeda, p. 471.

"Proceedings of the Advanced Turbine Systems Annual Program Review Meeting", "Flow and Heat Transfer in Gas Turbine Disk Cavities Subject to Nonuniform External Pressure Field", Ramendra Roy, p. 483.

"Proceedings of the Advanced Turbine Systems Annual Program Review Meeting", "Closed–Loop Mist/Steam Cooling for Advanced Turbine System", Ting Wang, p. 499.

"Proceedings of the Advanced Turbine Systems Annual Program Review Meeting", "Heat Pipe Turbine Vane Cooling", Langston et al., p. 513.

"Proceedings of the Advanced Turbine Systems Annual Program Review Meeting", "EPRI's Combustion Turbine Program: Status and Future Directions", Arthur Cohn, p. 535.

"Proceedings of the Advanced Turbine Systems Annual Program Review Meeting", "ATS Materials Support", Michael Karnitz, p. 553.

"Proceedings of the Advanced Turbine Systems Annual Program Review Meeting", "Land Based Turbine Casting Initiative", Boyd A. Mueller, p. 577.

"Proceedings of the Advanced Turbine Systems Annual Program Review Meeting", "Turbine Airfoil Manufacturing Technology", Charles S. Kortovich, p. 593.

"Proceedings of the Advanced Turbine Systems Annual Program Review Meeting", "Hot Corrosion Testing of TBS's ", Norman Bornstein, p. 623.

"Proceedings of the Advanced Turbine Systems Annual Program Review Meeting", "Ceramic Stationary Gas Turbine", Mark van Roode, p. 633.

"Proceedings of the Advanced Turbine Systems Annual Program Review Meeting", "Western European Status of Ceramics for Gas Turbine", Tibor Bornemisza, p. 659.

"Proceedings of the Advanced Turbine Systems Annual Program Review Meeting", "Status of Ceramic Gas Turbines in Russia", Mark van Roode, p. 671.

"Status Report: The U.S. Department of Energy's Advanced Turbine systems Program", facsimile dated Nov. 7, 1996.

"Testing Program Results Validate Ge's H Gas Turbine – High Efficiency, Low Cost of Electricity and Low Emissions", Roger Schonewald and Patrick Marolda.

"Testing Program Results Validate GE's H Gas Turbine – High Efficiency, Low Cost of Electricity and Low Emissions", Slide Presentation –working draft.

"The Next Step in H... For Low Cost Per kW–Hour Power Generation", LP–1 PGE '98.

"Utility Advanced Turbine System (ATS) Technology Readiness Testing and Pre–Commercialization Demonstration", Document #486040, Oct. 1–Dec. 31, 1996, Publication Date, Jun. 1, 1997, Report Numbers: DOE/MC/31176—5628.

"Utility Advanced Turbine System (ATS) Technolgy Readiness Testing—Phase 3", Document #666274, Oct. 1, 1996–Sep. 30, 1997, Publication Date, Dec. 31, 1997, Report Numbers: DOE/MC/31176–10.

"Utility Advanced Turbine System (ATS) Technology Readiness Testing and Pre–Commercial Demonstration, Phase 3", Document #486029, Oct. 1 –Dec. 31, 1995, Publication Date, May 1, Report Numbers: DOE/MC/31176–5340.

"Utility Advanced Turbine System (ATS) Technology Readiness Testing and Pre–Commercial Demonstration–Phase 3", Document #486132, Apr. 1 –Jun. 30, 1976, Publication Date, Dec. 31, 1996, Report Numbers DOE/MC 31176–5660.

"Utility Advanced Turbine System (ATS) Technology Readiness Testing and Pre–Commercial Demonstration—Phase 3", Document #587906, Jul. 1 –Sep. 30, 1995, Publication Date, Dec. 31, 1995, Report Numbers: DOE/MC/31176—5339.

"Utility Advanced Turbine System (ATS) Technology Readiness Testing and Pre–Commercial Demonstration", Document #666277, Apr. 1 –Jun. 30, 1997, Publication Date, Dec. 31, 1997, Report Numbers: DOE/MC/31176–8.

"Utility Advanced Turbine System (ATS) Technology Readiness Testing and Pre–Commercialization Demonstration"Jan. 1 –Mar. 31, 1996, DOE/MC/31776—5338.

"Utility Advanced Tubrine System (ATS) Technology Readiness Testing: Phase 3R", Document #756552, Apr. 1 –Jun. 30, 1999, Publication Date, Sep. 1, 1999, Report Numbers: DE—FC21–95MC31176–23.

"Utility Advanced Turbine Systems (ATS) Technology Readiness Testing", Document #656823, Jan. 1 –Mar. 31, 1998, Publication Date, Aug 1, 1998, Report Numbers: DOE/MC/31176–17.

"Utility Advanced Turbine Systems (ATS) Technology Readiness Testing and Pre–Commercial Demonstration", Annual Technical Progress Report, Reporting Period: Jul. 1, 1995 –Sep. 30, 1996.

"Utility Advanced Turbine Systems (ATS) Technology Readiness Testing", Phase 3R, Annual Technical Progress Report, Reporting Period: Oct. 1, 1997 –Sep. 30, 1998.

"Utility Advanced Turbine Systems (ATS) Technology Readiness Testing", Document #750405, Oct. 1 –Dec. 30, 1998, Publication Date: May, 1, 1999, Report Numbers: DE–FC21–95MC31176–20.

"Utility Advanced Turbine Systems (ATS) Technology Readiness Testing", Document #1348, Apr. 1 –Jun. 29, 1998, Publication Date Oct. 29, 1998, Report Numbers DE–FC21–95MC31176—18.

"Utility Advanced Turbine Systems (ATS) Technology Readiness Testing –Phase 3", Annual Technical Progress Report, Reporting Period: Oct. 1, 1996 –Sep. 30, 1997.

"Utility Advanced Turbine Systems (ATS) Technology Readiness Testing and Pre–Commercial Demonstration", Quarterly Report, Jan. 1 –Mar. 31, 1997, Document #666275, Report Numbers: DOE/MC/31176–07.

"Proceedings of the 1997 Advanced Turbines Systems", Annual Program Review Meeting, Oct. 28–29, 1997.

* cited by examiner

ROTATING DIFFUSER FOR PRESSURE RECOVERY IN A STEAM COOLING CIRCUIT OF A GAS TURBINE

This application is a continuation of application Ser. No. 09/239,276, filed Jan. 29, 1999 (abandoned), the entire content of which is hereby incorporated by reference in this application.

The Government of the United States of America has rights in this invention pursuant to COOPERATIVE AGREEMENT NO. DE-FC21-95MC31176 awarded by the U.S. Department of Energy.

TECHNICAL FIELD

The present invention generally relates to a steam-cooling circuit in a gas turbine and particularly relates to pressure recovery in a spent cooling steam return passage in the steam-cooling circuit of a gas turbine for improving cooling system efficiency. The present invention also relates to pressure recovery in the spent cooling steam return passage of a gas turbine employed in a combined cycle system for improving the performance of the system.

BACKGROUND OF THE INVENTION

In an advanced gas turbine design, at least certain of the rotating parts carried by the rotor, for example, the first and second-stage buckets, are steam-cooled. Minimization of the pressure drop in the turbine rotor steam cooling circuit is essential to the performance of the design. All components of the steam circuit are therefore designed for minimum pressure drop. In the advanced gas turbine design, a bore tube assembly is provided in which coaxial tubes define cooling steam supply and return passages. The cooling steam supply passage comprises an annular passage about the return passage for supplying cooling steam through a plurality of radially outwardly extending tubes for transmission axially along the rim of the rotor to the first and second-stage buckets. Return of the spent cooling steam from the buckets is provided by a plurality of axially extending circumferentially spaced passages along the rim of the rotor which communicate with the axial return passage via a plurality of radially inwardly extending return tubes. Thus, cooling steam enters the bore tube assembly from an upstream static supply manifold and leaves the rotor exiting the spent cooling steam return passage via a downstream static pipe. The diameter of the static pipe is significantly larger than the return passage in the bore tube assembly. Sudden expansion, however, from the bore tube return passage diameter to the diameter of the larger pipe disadvantageously creates a significant pressure loss.

It will also be appreciated that the advanced gas turbine design may be used in, although is not exclusively for, a combined cycle system. In a combined cycle system, exhaust gases from a gas turbine are used to heat steam in a heat recovery steam generator and which steam is supplied to a steam turbine, typically including high, intermediate and low pressure turbines wherein the gas and steam turbines are coupled on a common shaft or on different shafts to drive one or more generators for the generation of electricity. The cooling steam for the rotating parts of the gas turbine may be supplied from the exhaust of the high pressure steam turbine. The spent cooling steam from the gas turbine is combined with hot reheat steam from the heat recovery steam generator for use in driving the intermediate pressure steam turbine. Accordingly, there is a need for a reduction in the pressure drop in the steam-cooling circuit for the gas turbine.

BRIEF SUMMARY OF THE INVENTION

In accordance with a preferred embodiment of the present invention, a diffuser is provided in the return spent cooling steam passage to reduce the pressure drop and hence recover at least in part some of the axial velocity head in the bore tube assembly through a gradual expansion of the spent cooling steam. The gradual expansion is achieved by providing a diffuser as part of the rotating tube defining the spent cooling steam return passage. The rotating diffuser is located just upstream of the static pipe which receives the spent cooling steam and directs that flow to the intermediate pressure steam turbine in the combined cycle system. That is, the rotating diffuser increases in cross-sectional area in a downstream direction, hence reducing the pressure drop. Given the limited axial length of the bore tube assembly within which the area ratio must be extant, a flow separation or undesirable flow instabilities may occur if the full area ratio is used in the available axial length. Accordingly, the diffuser is preferably cropped in that it does not expand the exit steam to a cross-sectional area corresponding to the cross-sectional area of the static pipe receiving the spent returning cooling steam. Thus, the diffuser expands the steam gradually to an area slightly less than the diameter of the static pipe, followed by a sudden expansion further expanding the steam to the pipe diameter. It will be appreciated that by reducing the pressure drop in the cooling steam return passage, the high pressure steam turbine is enabled to operate at a higher pressure ratio, i.e., a greater expansion of the steam and the high pressure steam turbine is achieved, improving cycle efficiency.

In a preferred embodiment according to the present invention, there is provided in a combined cycle system having a gas turbine including rotating steam-cooled parts, a steam turbine, and a heat recovery steam generator in heat transfer relation with hot exhaust gases of the gas turbine for heating steam for flow to the steam turbine, a steam supply conduit for flowing steam exhausted from the steam turbine to the gas turbine for cooling the rotating parts and a return conduit for flowing spent cooling steam from the gas turbine to the steam turbine, a diffuser in the return conduit for reducing pressure drop and increasing combined cycle efficiency.

In a further preferred embodiment according to the present invention, there is provided in a gas turbine having a rotor rotatable about an axis and carrying steam-cooled parts, a bore tube assembly forming part of the rotor, comprising cooling steam supply and spent cooling steam return passages concentrically disposed about the axis with the supply passage forming an annular passage about the return passage and separated therefrom by a rotatable bore tube defining the return passage, the bore tube including a diffuser having an upstream cross-sectional area less than a downstream cross-sectional area thereof for recovering axial velocity head in the return tube through expansion of the returning spent cooling steam.

In a still further preferred embodiment according to the present invention, there is provided in a combined cycle system having a gas turbine including rotating steam-cooled parts, high and intermediate pressure steam turbines, and a heat recovery steam generator in heat transfer relation with hot exhaust gases from the gas turbine for heating steam for flow to the high pressure and intermediate pressure steam turbines, the gas turbine including a rotor rotatable about an axis and having a bore tube assembly including cooling steam supply and spent cooling steam return passages concentrically disposed about the axis with the supply passage forming an annular passage about the return passage and separated therefrom by a bore tube defining the return passage and rotatable with the rotor about the axis, a method of increasing combined cycle efficiency including expanding the returning spent cooling steam along the return passage by disposing a diffuser in the return passage with an upstream cross-sectional area less than a downstream cross-sectional area thereof.

DETAILED DESCRIPTION OF THE INVENTION

Figure 1:
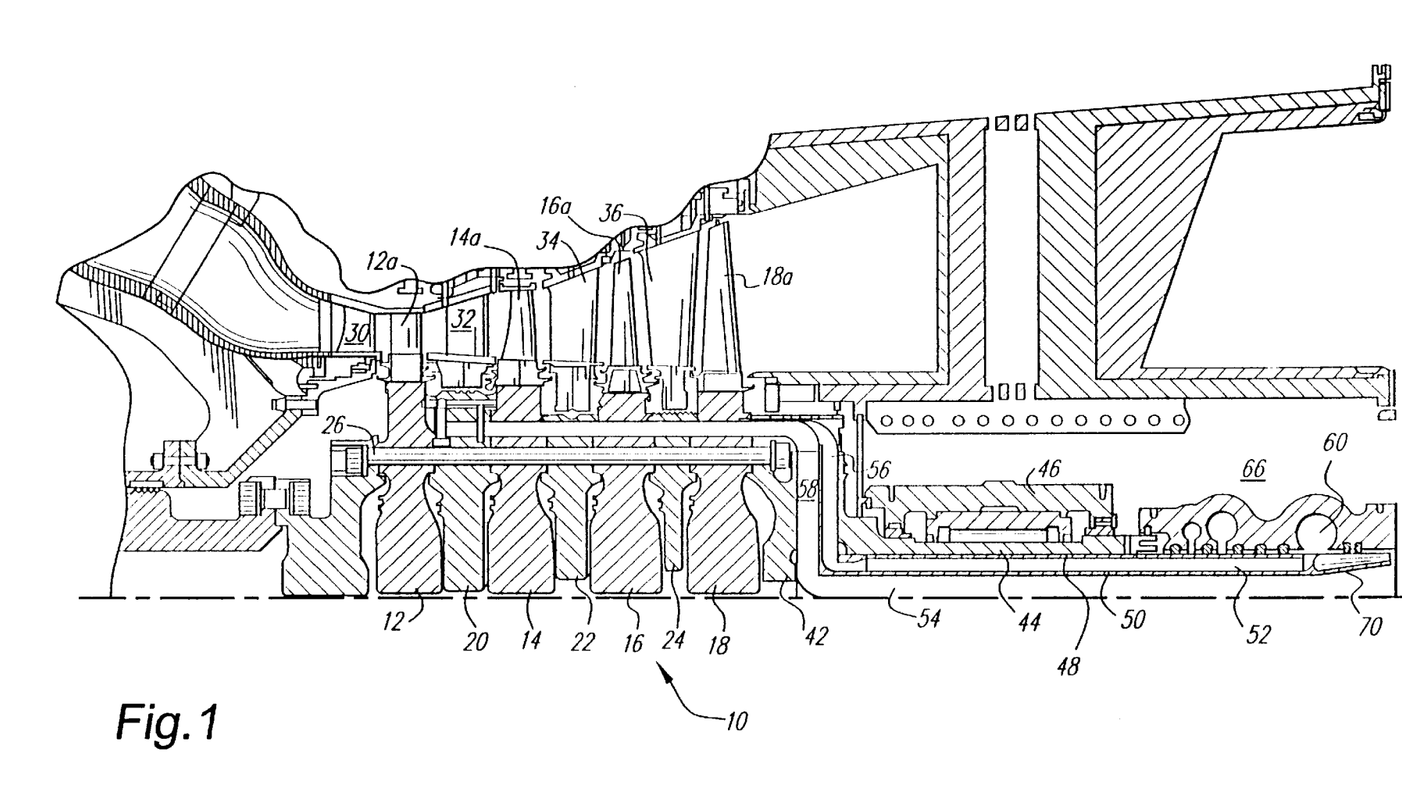
FIG. 1 is a fragmentary cross-sectional view of a portion of a gas turbine illustrating a turbine section and a bore tube assembly defining supply and return passages for cooling steam.

Referring now to the drawings, there is illustrated a portion of a turbine, including a turbine rotor, generally designated 10, comprised of stacked elements, for example, the rotor wheels 12, 14, 16 and 18 which form portions of a four-stage exemplary turbine rotor with spacers 20, 22 and 24 alternating between the wheels. The wheel and spacer elements are held together in the rotor by a plurality of elongated, circumferentially extending bolts, only one of which is illustrated at 26. The wheels 12, 14, 16 and 18 mount a plurality of circumferentially spaced turbine buckets 12a, 14a, 16a and 18a, respectively. Nozzles 30, 32, 34 and 36 form stages with the buckets 12a, 14a, 16a and 18a, respectively. An aft shaft wheel 42 forms part of the rotor 10 and is bolted to the stacked wheels and spacers.

Figure 2:
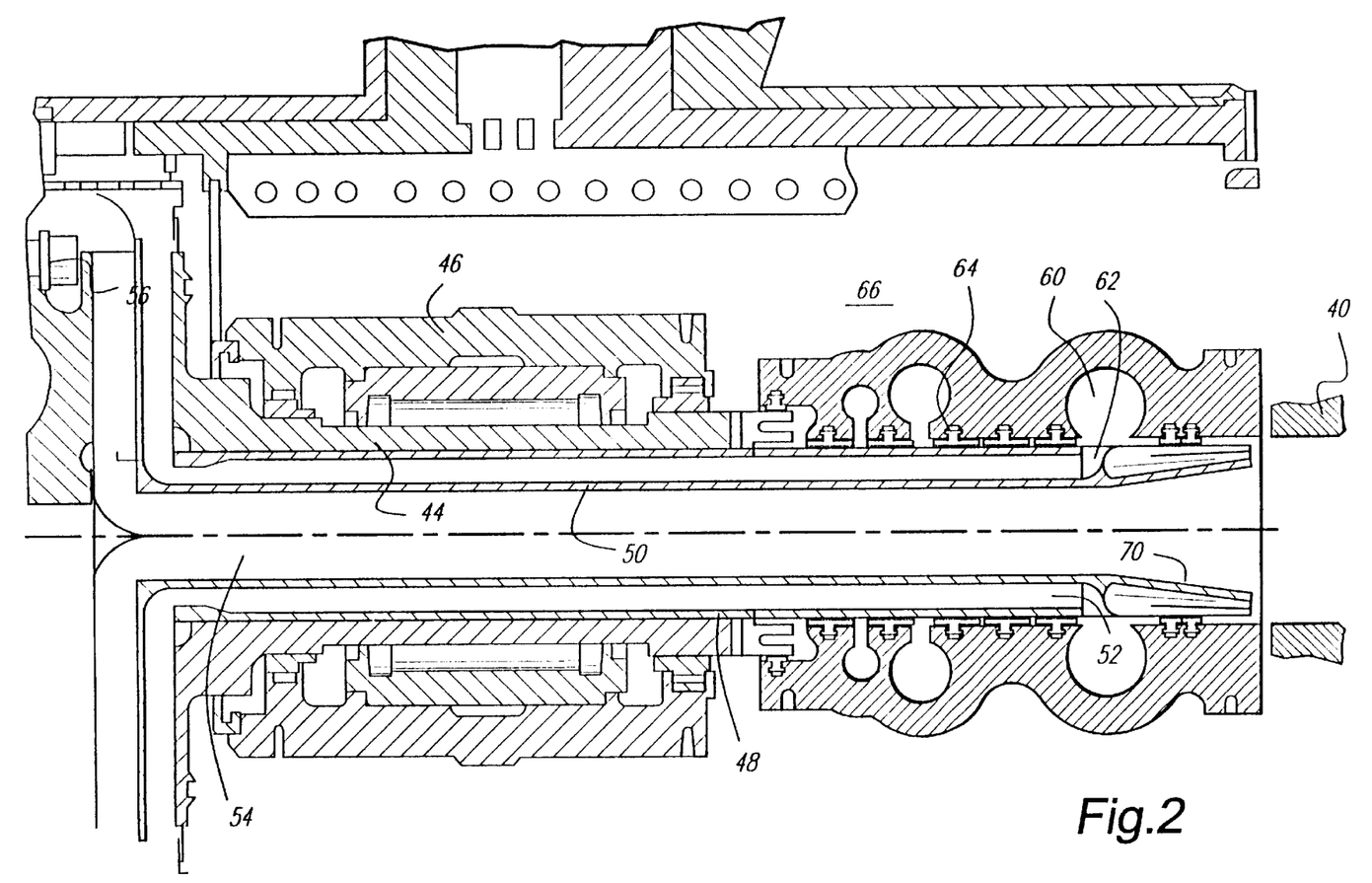
FIG. 2 is an enlarged view of the bore tube assembly illustrated in FIG. 1.

In an advanced gas turbine design of the assignee hereof, the aft shaft 44 houses a bore tube assembly described and illustrated in detail in co-pending U.S. patent application Ser. No. 09/216,363. Particularly, the bore tube assembly includes outer and inner tubes 48 and 50, respectively, defining an annular steam-cooling passage 52 and a spent steam-cooling return passage 54. The passages 52 and 54 communicate steam to and from the outer rim of the rotor through sets of radially extending conduits or tubes 56 and 58, respectively, which in turn communicate with longitudinally extending tubes spaced circumferentially about the rim of the rotor. The steam supplied through the steam supply passage 52 and radial tubes 56 supply cooling steam to buckets 12a and 14a of the first and second stages, respectively, while the radial tubes 58 and return passage 54 receive the spent cooling steam from the buckets for return to a stationary or static pipe 40 (FIG. 2). It will be appreciated that the bore tubes 48 and 50 are part of and rotate with the rotor 10.

More particularly, the cooling steam is supplied from a plenum 60 to the annular passage 52 via an annular entrance opening 62. Various labyrinth seals 64 are provided on opposite sides of the plenum 60. Note that the inner tube 50 comprises a substantially constant diameter from the axial position at which it receives spent returning cooling steam from tubes 58 to an axial position adjacent the location of the plenum 60. In accordance with a preferred embodiment of the present invention, the tube 50 extends from that axial location in an aft direction to include a diffuser 70. The diffuser 70 terminates at its aft end substantially coincident with the aft end of the rotating rotor and lies in communication with the static pipe 40 (FIG. 2). Diffuser 70, of course, increases from a cross-sectional area at its upstream end corresponding to the cross-sectional area of the tube 50 to an enlarged cross-sectional area at its downstream aft end. It will be appreciated, therefore, that the employment of the diffuser 70 decreases the pressure drop along the tube 50 and recovers a portion of the axial velocity head in the bore tube through a gradual expansion to the aft end of the diffuser 70.

As illustrated in FIG. 2, the aft end of diffuser 70 is reduced in cross-sectional area as compared with the cross-sectional area of the static pipe 40. Because of the possibility of undesirable flow instabilities or separation, diffuser 70 is cropped in relation to the static pipe 40 such that the exit of the bore tube including diffuser 70 does not expand gradually to the static piping diameter. The returning cooling steam is thus expanded gradually through the diffuser to a cross-sectional area slightly less than that of the static pipe 40 and a sudden expansion takes place along the step between the aft end of diffuser 70 and static pipe 40, further expanding the steam to the pipe diameter. As a consequence of the diffuser in the cooling steam return passage, increased cooling system efficiency by decreasing pressure drop is accomplished.

Figure 3:
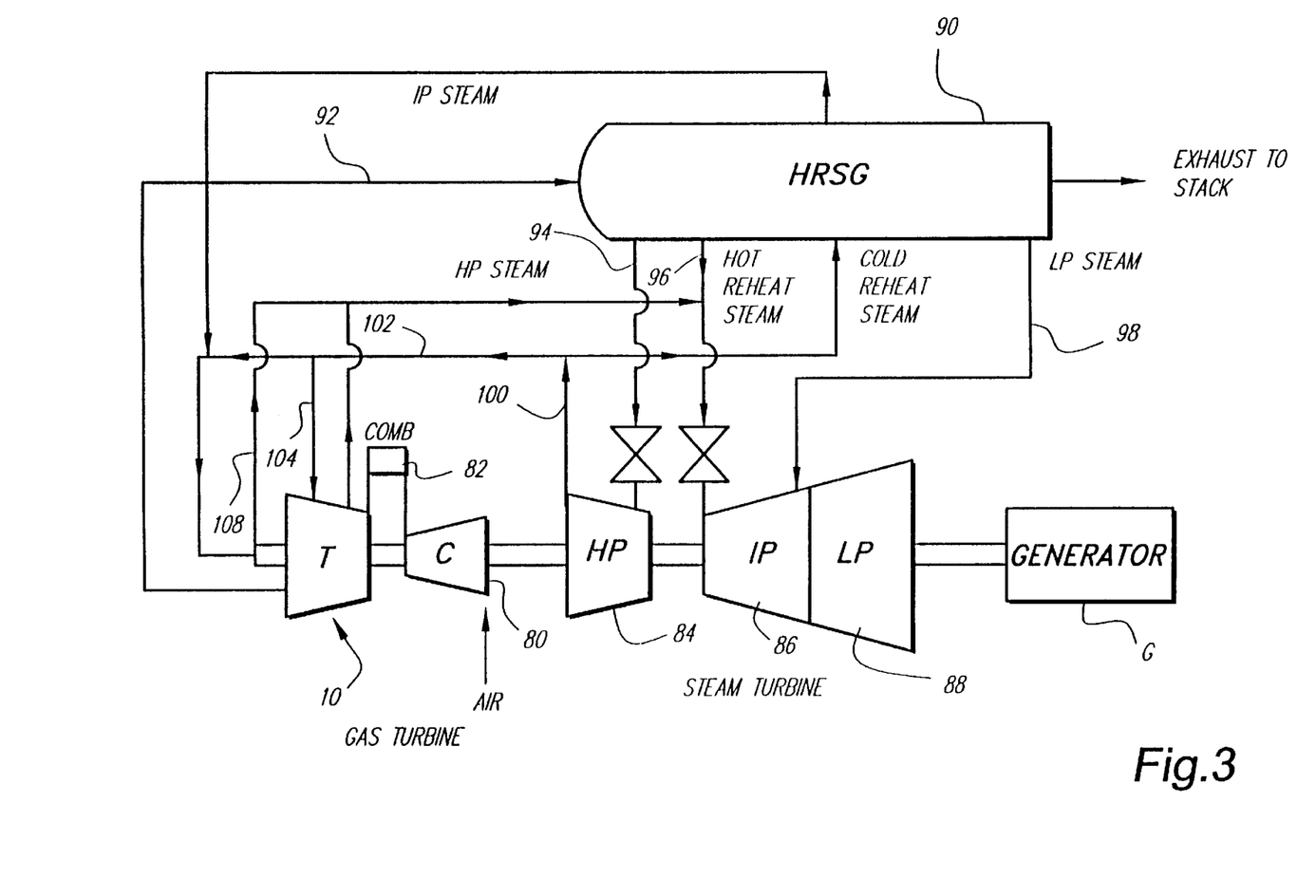
FIG. 3 is a schematic illustration of a combined cycle system employing the present invention.

Referring to FIG. 3, the gas turbine disclosed in FIGS. 1 and 2 may be used in a combined cycle system illustrated in FIG. 3. In the system of FIG. 3, the gas turbine 10 includes a compressor 80, and a combustor 82 whereby hot gases of combustion are supplied turbine 10. The combined cycle system illustrated includes high pressure, intermediate pressure and low pressure steam turbines 84, 86 and 88, respectively. As illustrated, the gas and steam turbines lie on a single shaft for driving a generator G, although it will be appreciated that the steam and gas turbines may lie on different shafts for driving different generators.

A heat recovery steam generator 90 (HRSG) is also illustrated. As in conventional combined cycle systems, the hot exhaust gases from the gas turbine 10 flow through the HRSG 90 via a conduit 92 whereby steam is generated and reheated in the HRSG for supply to the steam turbines and to the cooling circuit for the gas turbine. Particularly, super-heated steam is supplied from the HRSG 90 via conduit 94 to the high pressure steam turbine 84. Hot reheat steam and low pressure steam are supplied to the intermediate pressure and low pressure steam turbines 86 and 88, respectively, via respective conduits 96 and 98. Cooling steam is supplied from the high pressure steam turbine exhaust via conduits 100 and 102 to the steam supply plenum 60 of the gas turbine 10 for supplying cooling steam to the rotating parts of the gas turbine. Cooling steam is also provided to other parts, i.e., static parts of the gas turbine via conduit 104 in communication with conduit 102. Spent return cooling steam from the gas turbine is supplied via tube 50 to the static pipe 40 and via a conduit 108 to the hot reheat steam conduit 96 where it joins the hot reheat steam for supplying and driving the intermediate pressure steam turbine 86.

It will be appreciated that with the reduced pressure drop afforded by the diffuser 70 in the gas turbine, a higher pressure ratio may be provided in the high pressure steam turbine. The pressure drop also affords the capacity to increase the cooling steam flow to the buckets or to provide a higher pressure ratio in the high pressure steam turbine or both.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a combined cycle system having a gas turbine including rotating steam-cooled parts, a steam turbine, and a heat recovery steam generator in heat transfer relation with hot exhaust gases of said gas turbine for heating steam for flow to the steam turbine, a steam supply conduit for flowing steam exhausted from said steam turbine to the gas turbine for cooling the rotating parts and a return conduit for flowing spent cooling steam from said gas turbine to said steam turbine, a diffuser in said return conduit for reducing pressure drop and increasing combined cycle efficiency.

2. A system according to claim 1 wherein said gas turbine includes a rotor rotatable about an axis and carrying said steam cooled parts, said return conduit including a passageway coaxial with an axis of rotation of said rotor.

3. A system according to claim 2 wherein said supply and return conduits are coaxial relative to one another.

4. A system according to claim 1 wherein said gas turbine includes a rotor rotatable about an axis and carrying said steam cooled parts, said return conduit including a passageway coaxial with an axis of rotation of said rotor, said return conduit forming part of and rotating with said rotor.

5. A system according to claim 4 wherein said return conduit includes a stationary pipe defining a passage in communication with said passageway for receiving the spent cooling steam.

6. A system according to claim 5 wherein said diffuser has an exit area less than an entrance area of said stationary pipe enabling further expansion of the spent cooling steam to a diameter of said pipe.

7. A system according to claim 1 wherein said steam turbine comprises high and intermediate pressure steam turbines, said heat recovery steam generator heating steam generator heating steam for flow to the high pressure and intermediate pressure steam turbines, said steam supply conduit being connected between said high pressure steam turbine and said gas turbine for flowing the steam exhausted from the high pressure steam turbine to said gas turbine, and said return conduit being connected between said intermediate steam turbine and said gas turbine.

8. A system according to claim 7 wherein said gas turbine includes a rotor rotatable about an axis and carrying said steam cooled parts, said return conduit including a passageway coaxial with an axis of rotation of said rotor.

9. A system according to claim 8 wherein said supply and return conduits are coaxial relative to one another.

10. A system according to claim 7 wherein said gas turbine includes a rotor rotatable about an axis and carrying said steam cooled parts, said return conduit including a passageway coaxial with an axis of rotation of said rotor, said return conduit forming part of and rotating with said rotor.

11. A system according to claim 10 wherein said return conduit includes a stationary pipe defining a passage in communication with said passageway for receiving the spent cooling steam.

12. A system according to claim 11 wherein said diffuser has an exit area less than an entrance area of said stationary pipe enabling further expansion of the spent cooling steam to a diameter of said pipe.

13. In a gas turbine having a rotor rotatable about an axis and carrying steam-cooled parts, a bore tube assembly forming part of said rotor, comprising cooling steam supply and spent cooling steam return passages concentrically disposed about said axis with said supply passage forming an annular passage about said return passage and separated therefrom by a rotatable bore tube defining said return passage, said bore tube including a diffuser having an upstream cross-sectional area less than a downstream cross-sectional area thereof for recovering axial velocity head in the return tube through expansion of the returning spent cooling steam.

14. A system according to claim 13 including a static pipe in communication with said return passage downstream of said diffuser for receiving spent cooling steam from said rotating bore tube.

15. A system according to claim 14 wherein said diffuser has an exit area less than an entrance area of said static pipe enabling further expansion of the spent cooling steam to a diameter of said static pipe.

16. In a combined cycle system having a gas turbine including rotating steam-cooled parts, high and intermediate pressure steam turbines, and a heat recovery steam generator in heat transfer relation with hot exhaust gases from said gas turbine for heating steam for flow to the high pressure and intermediate pressure steam turbines, said gas turbine including a rotor rotatable about an axis and having a bore tube assembly including cooling steam supply and spent cooling steam return passages concentrically disposed about said axis with said supply passage forming an annular passage about said return passage and separated therefrom by a bore tube defining said return passage and rotatable with said rotor about said axis, a method of increasing combined cycle efficiency including expanding the returning spent cooling steam along said return passage by disposing a diffuser in said return passage with an upstream cross-sectional area less than a downstream cross-sectional area thereof.

17. A method according to claim 16 including disposing a static pipe in communication with said return passage for receiving the spent cooling steam from said return passage, and expanding the returning spent cooling steam from a predetermined exit area of said diffuser to an entrance area of said static pipe larger than said exit area and said entrance area lying substantially at a common location.

* * * * *